(No Model.)
J. H. SCHRIVER.
THILL COUPLING.
No. 429,485. Patented June 3, 1890.
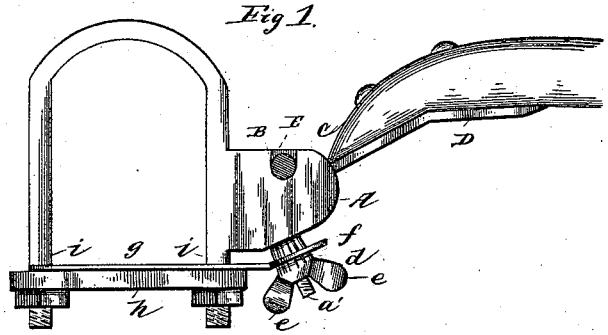
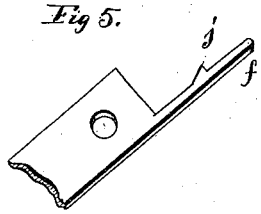
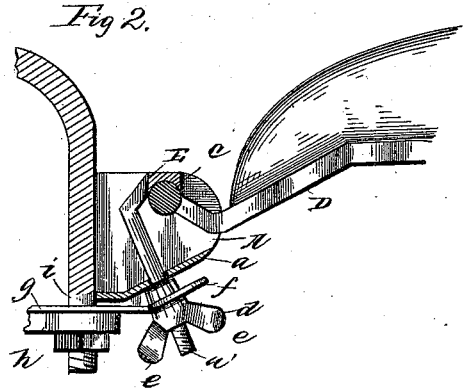
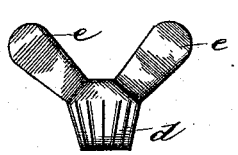
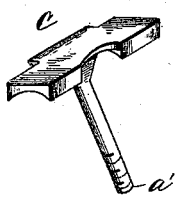
Witnesses
P. W. Stevens
S. Stewart
Inventor
John H. Schriver
By Myers & Co
Attorneys

UNITED STATES PATENT OFFICE.

JOHN H. SCHRIVER, OF YORK SPRINGS, PENNSYLVANIA.

THILL-COUPLING.

SPECIFICATION forming part of Letters Patent No. 429,485, dated June 3, 1890.

Application filed April 5, 1890. Serial No. 346,652. (No model.)

*To all whom it may concern:*

Be it known that I, JOHN H. SCHRIVER, a citizen of the United States of America, residing at York Springs, in the county of Adams and State of Pennsylvania, have invented certain new and useful Improvements in Thill-Couplings, of which the following is a specification, reference being had therein to the accompanying drawings.

My invention pertains to an improvement in thill-couplings; and it consists in the peculiar construction, combination, and arrangement of the parts whereby an exceedingly efficient and durable thill-coupling is produced, as hereinafter fully described, and shown in the accompanying drawings, wherein—

Figure 1 is a side elevation of my thill-coupling. Fig. 2 is a sectional elevation thereof, and Figs. 3 and 4 are detail views thereof. Fig. 5 is a detail perspective view of the spring-pawl, parts being broken away.

In constructing my thill-coupling I provide in horizontal bearings arms A and concave recesses B, the arms being each integral with the clip, and the concave recesses B being designed for the reception of cross-bar C, cast integral with thill-iron D.

The metallic clamp and nut-holder E is curved at top to conform to the curvature of the cross-bar C, upon which it is disposed, and in continuation it is inclined downwardly, projecting through a corresponding orifice in connecting-piece $a$, and has integral therewith threaded bolt $a'$, and carries nut $d$, which latter is provided with a serrated periphery and also with the finger-pieces $e$ for its easy manipulation. Spring-pawl $f$ has its narrow edge aligned with the periphery of nut $d$, which is serrated. Spring-pawl $f$ also consists of metallic plate $g$, secured between clip $h$ and clip $i$, which latter at either end projects through orifices therein provided, and is thus secured, the pawl proper consisting of the narrow strip of notched metal, as aforesaid. Thus constructed as the thill-iron becomes worn it may be readily tightened by means of nut $d$, which nut is locked by the pawl-tooth $j$ abutting against the teeth formed on the nut's periphery, and thus constructed a highly-efficient and durable thill-coupling is produced.

Having thus fully described my invention, what I claim, and desire to secure by Letters Patent, is—

1. A thill-coupling having a nut for tightening the thill as worn, the nut being prevented from rotating by a pawl abutting in serrations on the nut's periphery, substantially as shown and described.

2. The combination of the clip having recessed arms for reception of the thill, the metallic clamp, and the nut-holder, the serrated nut, and the spring having a tooth thereon which engages said serrated nut to prevent its rotation, substantially as shown and described.

3. In a thill-coupling, the metallic clamp and nut-holder for inclasping the cross-bar of the thill, the nut for rigidly securing the cross-bar in the concave recesses, and the spring having a tooth thereon serving as a pawl to prevent the rotation of the serrated nut, substantially as shown and described.

In testimony whereof I affix my signature in presence of two witnesses.

JOHN H. SCHRIVER.

Witnesses:
CYRUS G. BEALES,
I. W. PEARSON, Jr.